United States Patent [19]

Milling

[11] 3,900,802
[45] Aug. 19, 1975

[54] TWO STAGE GAS DYNAMIC LASER

[75] Inventor: Robert W. Milling, Dayton, Ohio

[73] Assignee: The United States of America as represented by the Secretary of the Air Force, Washington, D.C.

[22] Filed: June 8, 1973

[21] Appl. No.: 369,031

[52] U.S. Cl. .............................. 331/94.5 G; 330/4.3
[51] Int. Cl. .............................................. H01s 3/08
[58] Field of Search ................ 331/94.5 G, 94.5 S; 330/4.3

[56] References Cited
UNITED STATES PATENTS

| | | | |
|---|---|---|---|
| 3,487,333 | 12/1969 | Hertzberg et al. .................. | 330/4.3 |
| 3,566,297 | 2/1971 | Blackman ...................... | 331/94.5 G |
| 3,665,336 | 5/1972 | McLafferty ..................... | 331/94.5 G |

OTHER PUBLICATIONS

Brown, "High Power CO₂ Electric Discharge Mixing Laser," 11/1/70, pg. 388–339, A.P.L. Vol. 17, No. 9.
Hertzberg et al., "Photon Generators and Engines . . . ," 1/27/71, pg. 1–16, AIAA No. 71-106, 9th Aerospace Sciences Meeting.

Primary Examiner—Maynard R. Wilbur
Assistant Examiner—N. Moskowitz
Attorney, Agent, or Firm—Joseph E. Rusz; Richard J. Killoren

[57] ABSTRACT

A gas dynamic laser having high temperature high pressure gas produced from combustion is expanded in a first nozzle to provide a population inversion in a first cavity from which laser energy is extracted. The gas is then passed through oblique shocks to compress the gas slightly after which heat is added to obtain major compression. The gas is then expanded in a second nozzle structure to provide a population inversion in a second cavity from which laser energy is extracted. The gas is again passed through oblique shocks to decelerate the flow slightly after which the gas is passed through a subsonic diffuser for release to the atmosphere.

3 Claims, 4 Drawing Figures

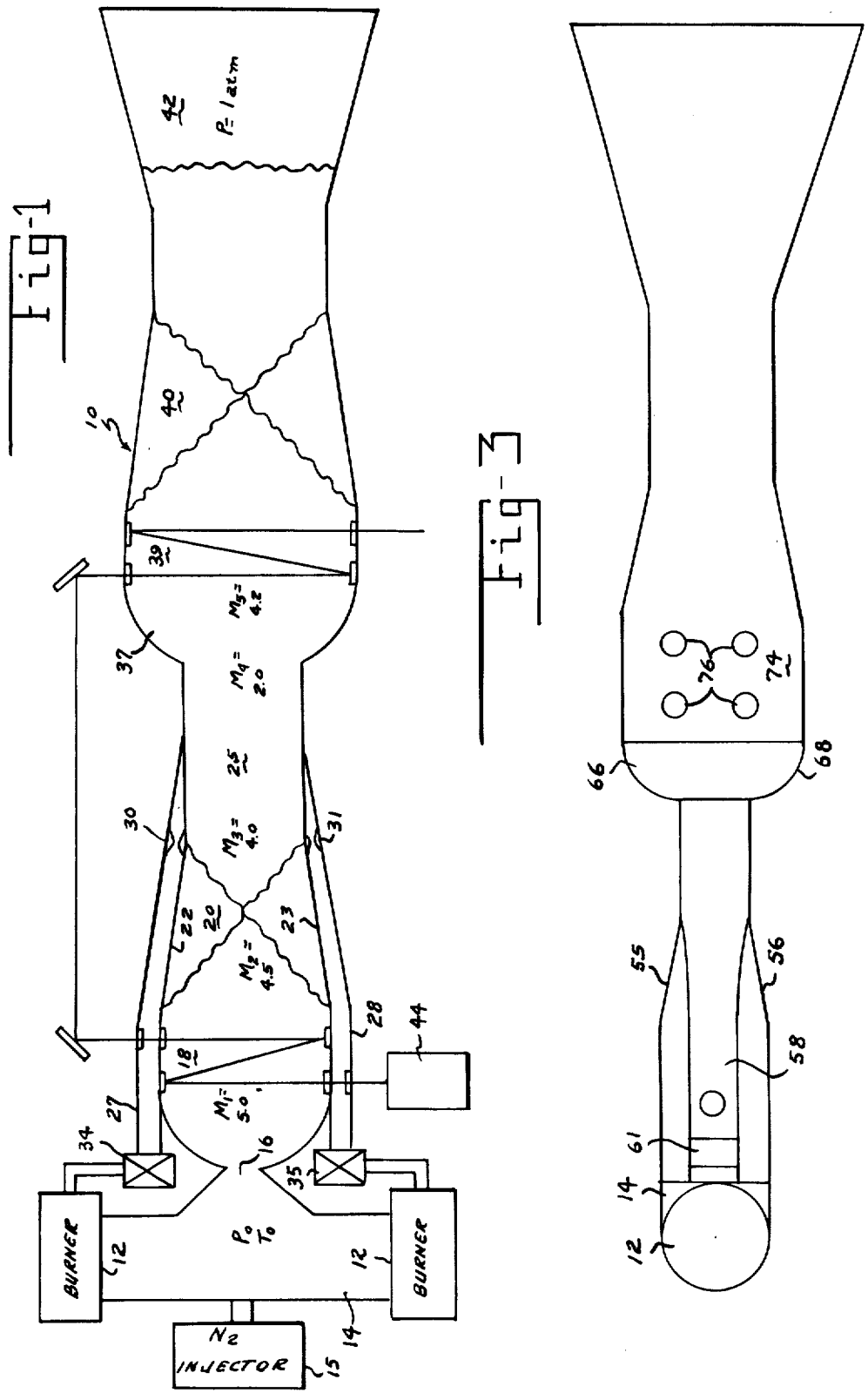

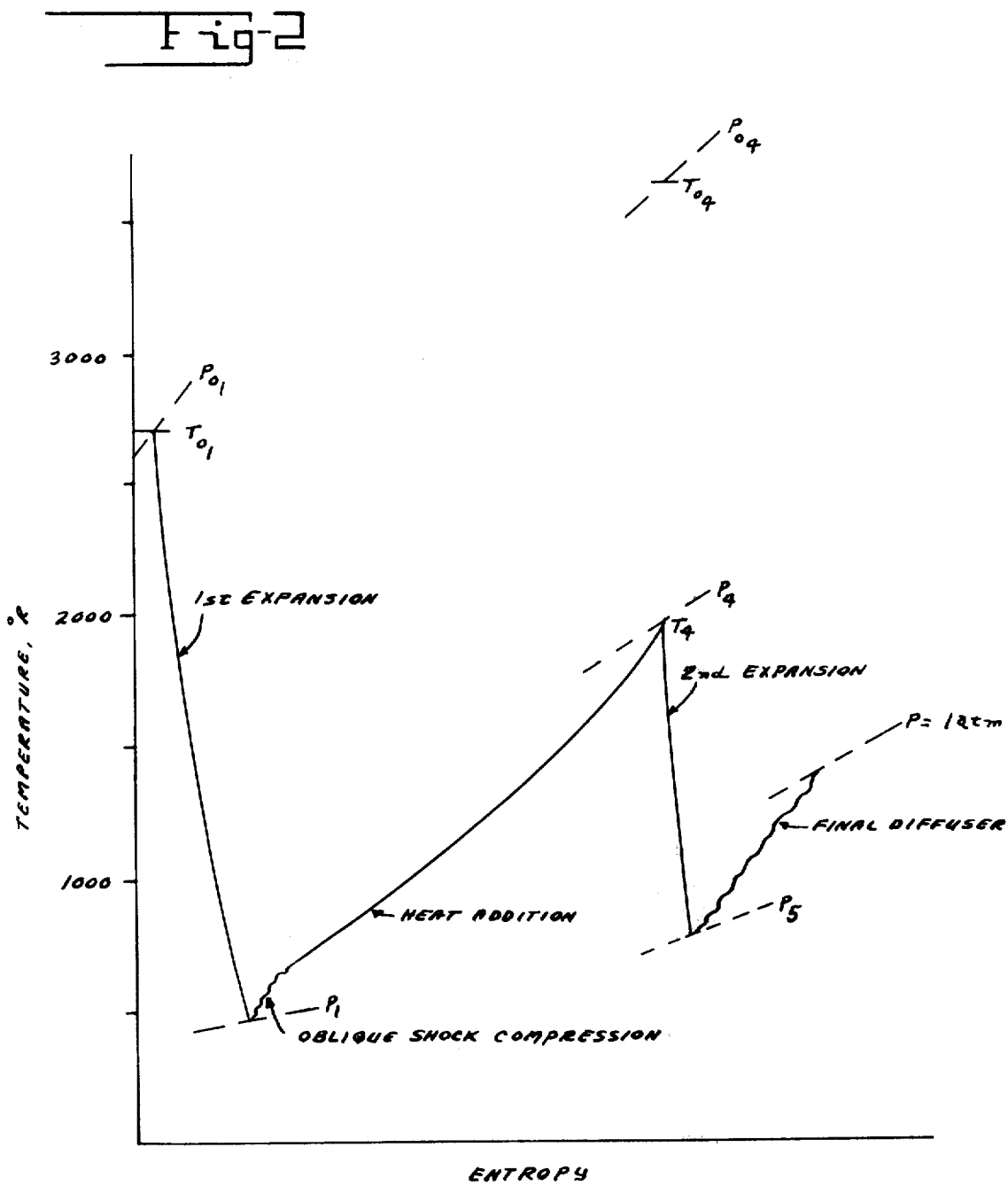

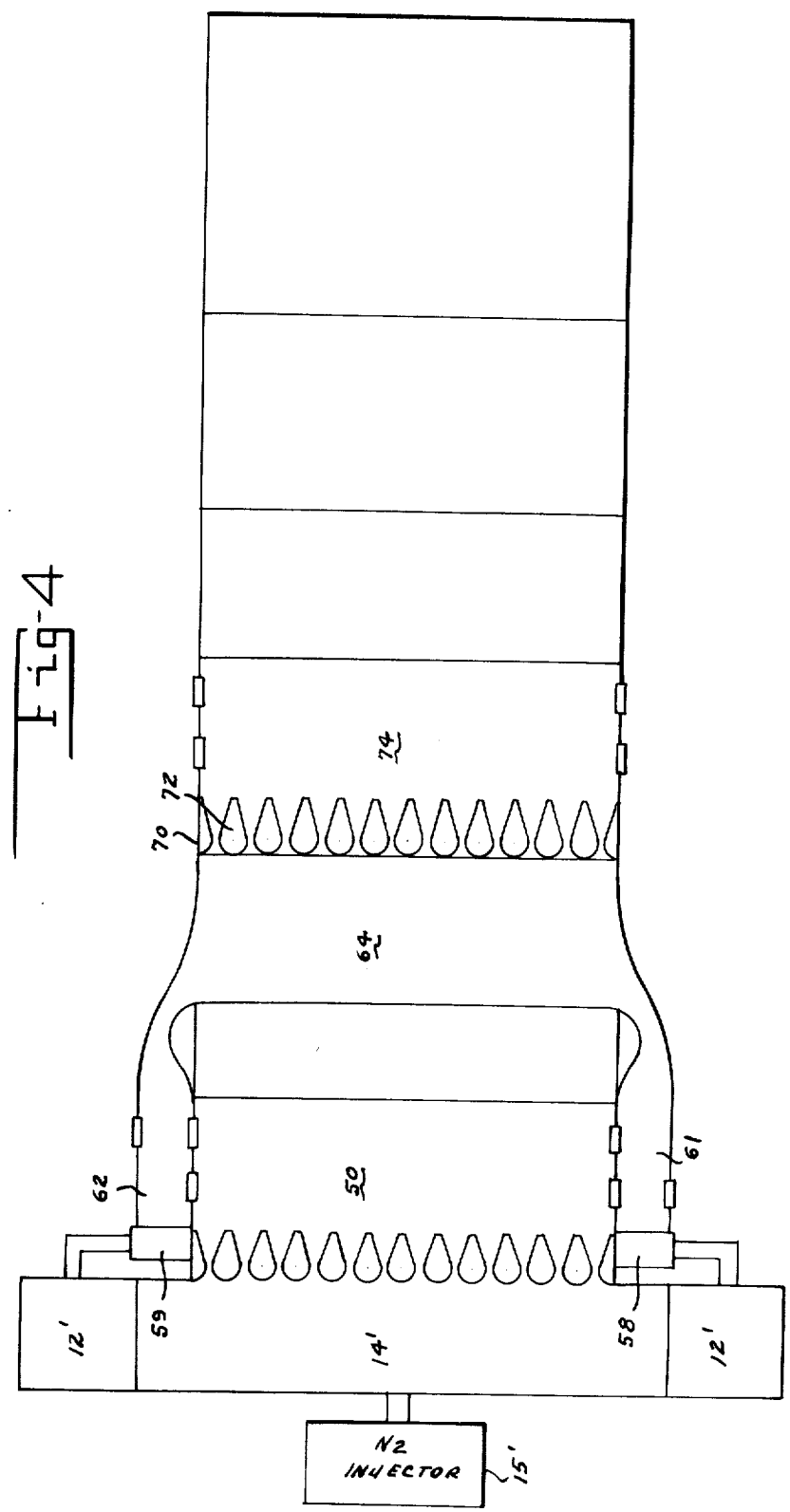

TWO STAGE GAS DYNAMIC LASER

RIGHTS OF THE GOVERNMENT

The invention described herein may be manufactured and used by or for the Government of the United States for all governmental purposes without the payment of any royalty.

BACKGROUND OF THE INVENTION

Gas dynamic lasers presently in use are limited to a single optical cavity for the extraction of laser energy. Many such systems are known in the prior art such as described in "Gas Dynamic Lasers," IEEE Spectrum, November 1970, pages 51–58; "Explosion-Pumped Gas Dynamic-$CO_2$ Lasers," Applied Physics Letters, Volume 19, Number 8, Oct. 15, 1971, pages 263–265; "Pulsed $CO_2$ Gas-Dynamic Lasers" Applied Physics Letters, Volume 19, Number 3, Aug. 1, 1971, pages 65–68 and "Laser Weapons — How Close are We?" Popular Science, March 1972, pages 64, 65, 66 and 142.

However, none of these or any other known gas dynamic laser teaches the use of a second optical cavity aerodynamically in series with the first cavity.

BRIEF SUMMARY OF THE INVENTION

According to this invention, a second optical cavity is placed aerodynamically in series with a first optical cavity. The first cavity is similar to those presently used in the art. After passing through the first optical cavity, the gas is compressed slightly by passing through weak oblique shocks. Major compression is then obtained by the addition of heat. The heat addition is accomplished by mixing gases from a combustor having the same fuel and oxidizer as the first stage. The combustor may be the same combustor used for the first stage or a separate combustor may be used.

The gases are then rapidly expanded to a high Mach number, thus producing a population inversion in a second optical cavity from which laser energy is extracted in a manner known in the art.

IN THE DRAWINGS

FIG. 1 is a schematic diagram showing a laser system according to the invention.

FIG. 2 shows the temperature entrophy diagram for the operation of the device of FIG. 1.

FIG. 3 shows a side elevation of another embodiment of the invention.

FIG. 4 is a top plan view of the nozzle and duct structure for the device of FIG. 3.

DETAILED DESCRIPTION OF THE INVENTION

Reference is now made to FIG. 1 of the drawing which shows a laser 10 having burners 12 for supplying combustion products to a plenum 14 and nozzle 16 as in the prior art. Nitrogen gas is supplied to plenum chamber 14 from supply 15. The expansion in nozzle 16 produces a population inversion in the laser cavity 18 in a manner known in the art. The gas is then compressed by passing through oblique shocks in region 20, by the turning of walls 22 and 23, as is known in the art. See for example "Supersonic Compression by Turning," Page 93 of "elements of Gasdynamics," by Liepmann and Roshko.

Major compression is then obtained by adding heat in the region 25. A portion of the gas from plenum 14 is supplied to region 25 through ducts 27 and 28 and nozzles 30 and 31. The flow in ducts 27 and 28 is controlled by valves 34 and 35 as will be explained later. The valve orifices and duct size are selected to provide about 1/10 of the mass flow through nozzles 30 and 31 and 9/10 of the mass flow through the nozzle 16. The nozzles 30 and 31 provide flow of the heated gas which is at the same Mach as the flow through region 25. The expansion in nozzle 37 produces a population inversion in the laser cavity 39. The gas is then compressed by passing through oblique shocks in region 40 and then passed through subsonic diffuser 42 to the atmosphere.

In the operation of the device, the gas supplied to plenum 14 from burners 12 and $N_2$ injector 15 is at a temperature of about 2,700°K and at a pressure of about 53 atmospheres. When the device is started, valves 34 and 35 are closed so that the normal shock travels down to the inlet to nozzle 37. The expansion in nozzle 16 produces a population inversion in region 18. The gas is then compressed slightly by passing through oblique shocks in region 20. A short time after the device is started and the normal shock has had time to travel to the inlet to nozzle 37, valves 34 and 35 are opened to supply hot gas to region 25. Major compression in region 25, due to the addition of hot gas, cause the normal shock to move on down through the channel. The expansion of the gas in nozzle 37 produces a population inversion in the second optical cavity 39.

The flow is then decelerated slightly by passing through oblique shocks in region 40. The gas is then brought to atmospheric pressure in subsonic diffuser 42. Laser energy may be extracted from cavities 18 and 39 in any manner known in the art such as by passing a laser beam from master oscillator source 44 through cavity 18 and then passing the light beam from cavity 18 through cavity 39 as shown. The entire process is represented in the temperature entropy diagram of FIG. 2, wherein: $Po_1$ is the stagnation pressure in the plenum 14, $P_1$ is the static pressure after the first expansion, $Po_4$ is the stagnation pressure after heat addition, $P_4$ is the static pressure after heat addition and $P_5$ is the static pressure after the second expansion.

The device of the invention may be used with nozzle structure, such as described in Popular Science article, as shown in FIGS. 3 and 4.

In this device, the first stage shown generally at 50 will operate substantially the same as in the device described in the Popular Science article. The oblique shocks in region 52 are produced by turning walls 55 and 56 inward, as shown in FIG. 3. Valves 58 and 59 control the flow through channels 61 and 62 as in the device of FIG. 1 to supply hot gas to mixing region 64. The walls 66 and 68 are made diverging to compensate for the converging portion 70 of nozzles 72. The ideal condition would be for the increase in nozzle area due to the divergence of walls 66 and 68 to exactly compensate for the convergence of the input section of nozzles 72 to provide a uniform flow cross section throughout the inlet region of the nozzles.

The walls 66 and 68 may be made to continue to diverge in the outlet region of nozzles 72 to provide nozzle expansion in both dimensions. In the second optical cavity 74, the optical path may be folded in both directions with additional reflector elements 76 if desired. The oblique shock region 77 and subsonic diffuser 79 may be substantially the same as in FIG. 1.

The gas mixture for laser operation need not be provided from a combustor, but may be produced in any way known in the art.

There is thus provided a laser system having two optical cavities placed aerodynamically in series.

I claim:

1. A two stage gas dynamic laser comprising: a plenum chamber means for supplying a high temperature, high pressure gas dynamic lasing medium to said plenum chamber; means for rapidly expanding said lasing medium to provide a population inversion in a first optical cavity; means for providing a first set of oblique shock waves in the gas flow path in the output of the first optical cavity to slightly compress the gas; means for adding heat to the gas after the slight compression to obtain a major compression of the gas; means for rapidly expanding the gas to provide a population inversion in a second optical cavity; means for providing a second set of oblique shock waves in the gas flow path in the output of the second optical cavity to decelerate the flow; a subsonic diffuser in the output of the oblique shock producing means and means for extracting laser energy from said first optical cavity and said second optical cavity.

2. The device as recited in claim 1 wherein the means for rapidly expanding said lasing medium to provide a population inversion in a first optical cavity is at least one supersonic nozzle connected to said plenum chamber and said means for rapidly expanding the gas to provide a population inversion in a second optical cavity is at least one supersonic nozzle.

3. The device as recited in claim 2 wherein the gas lasing medium is supplied from burners supplying products of combustion to said plenum chamber and $N_2$ gas supply connected to said plenum chamber; said means for adding heat to the gas including means for supplying products of combustion from said burners to the gas flow after the slight compression, wherein the mass flow through the last named means is approximately one-tenth the mass flow through the nozzle connected to said plenum chamber.

* * * * *